P. C. HOWLAND.
PAN.
APPLICATION FILED OCT. 27, 1908.

948,994.

Patented Feb. 15, 1910.

WITNESSES:
Thos. W. Riley
M. A. Newcomb

INVENTOR
P. C. Howland
BY
W. J. FitzGerald & Co.
Attorneys

UNITED STATES PATENT OFFICE.

PERCY C. HOWLAND, OF ROCKFORD, ILLINOIS.

PAN.

948,994.

Specification of Letters Patent.

Patented Feb. 15, 1910.

Application filed October 27, 1908. Serial No. 459,766.

*To all whom it may concern:*

Be it known that I, PERCY C. HOWLAND, a citizen of the United States, residing at Rockford, in the county of Winnebago and State of Illinois, have invented certain new and useful Improvements in Pans; and I do hereby declare the following to be a full, clear, and exact description of the invention, such as will enable others skilled in the art to which it appertains to make and use the same.

My invention relates to new and useful improvements in pans and more particularly to that class adapted to be used for catching the drippings from ice boxes and the like and my object is to provide a covering for the major portion of the upper end of the pan and arranging said covering whereby the drippings will be conveyed into the pan.

A further object is to provide a handle for the pan and arrange the same in such manner that when the pan is being carried, it will rest edgewise and a still further object is to provide an air vent for the pan, whereby the water or drippings will readily leave the pan when it is desired to empty the same.

Other objects and advantages will be hereinafter referred to and more particularly pointed out in the claims.

Figure 1:
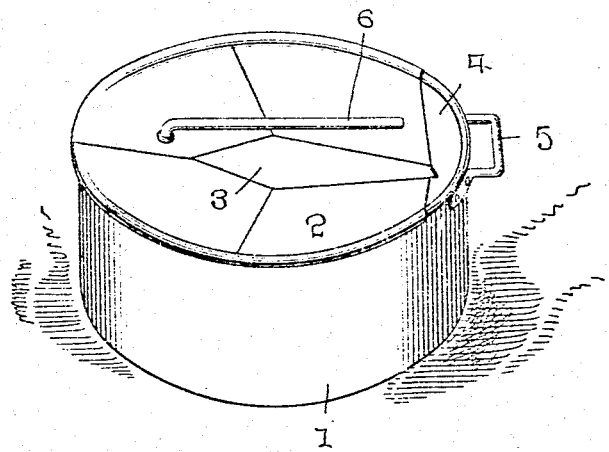
Figure 2:
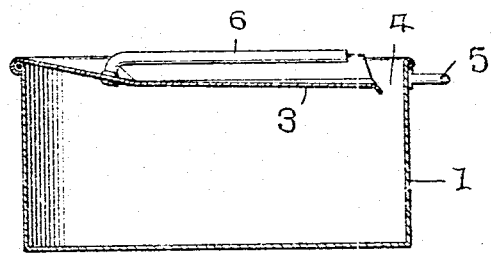

In the accompanying drawings which are made a part of this application, Figure 1 is a perspective view of my improved pan, and, Fig. 2 is a central vertical sectional view thereof.

Referring to the drawings in which similar reference numerals designate corresponding parts throughout the several views, 1 indicates the pan proper, which is constructed in the usual or any preferred manner, but is preferably circular in cross section.

Disposed over the upper end of the pan 1, is a cover 2, which cover is preferably inclined at various angles and terminates at its central portion in a trough 3, which trough extends from the central portion of the cover to one edge thereof and by which means the drippings when deposited on any portion of the cover, will be directed into the trough and thence into the pan.

A portion of the cover 2 is removed to form an opening 4, through which access may be had to the interior of the pan and by terminating the outer end of the trough at the center of the cut-away portion, the drippings from the trough will pass direct into the pan.

It has been found a difficult matter to carry a pan of this class when the same is substantially full of water, and to overcome this objectionable feature, a handle 5 is secured to the outer face of the pan 1 and at that point on the pan at which the opening 4 is placed, so that when it is desired to empty the pan, the handle 5 is grasped and the pan turned edgewise, the cover 2 retaining the water within the pan, so that it would be impossible to spill the water so long as the pan is turned edgewise and the opening maintained uppermost.

In emptying the pan, it is turned bottom upward so that the water will leave the pan through the opening 4 and to facilitate the passage of the water through the opening, a vent pipe 6 is secured to the cover at a point beyond the inner end of the trough 3 and is extended over the trough to a point adjacent the opening 4 and as said pipe communicates with the interior of the pan, air will pass through the pipe to the interior of the pan and permit the water to freely pass through the opening and without the usual accompanying noise occasioned in emptying vessels of this character without an air vent.

I am aware that pans have been provided for this purpose, but it has been necessary heretofore to place the pans in a certain position for the drippings to enter the same, while with the present construction, it is only necessary to place the pan in any position below the drip opening as the inclination of the cover and the provision of the trough will convey the drippings to the opening in the cover and deposit the same within the pan.

It will further be seen that by employing a pan of this construction, it can be more readily placed in position below the ice box, as the pan may be placed on the floor and shoved beneath the ice box with the foot, while by placing the handle toward the front of the box, said handle will always be in position to be grasped when it is desired to remove and empty the pan.

What I claim is:

1. The combination with a pan having a handle thereon; of a cover for said pan, a portion of said cover being removed to form an opening, said cover being downwardly inclined from its outer edge and terminating in a trough, one end of the trough communicating with said opening said handle being located adjacent said opening.

2. A pan having a handle and a cover for said pan, a portion of said cover adjacent its edge being removed to form an opening, said cover being inclined toward its center and terminating in a trough said trough extending from a point adjacent the center of the cover to said opening said handle being located adjacent said opening and a vent pipe secured to said cover.

In testimony whereof I have signed my name to this specification in the presence of two subscribing witnesses.

PERCY C. HOWLAND.

Witnesses:
C. A. LUNDBERG,
G. E. JOHNSON.